United States Patent
Lee et al.

(10) Patent No.: US 8,063,850 B2
(45) Date of Patent: Nov. 22, 2011

(54) DISPLAY APPARATUS INCLUDING PIXELS HAVING IMPROVED BRIGHTNESS AND CONTRAST RATIO

(75) Inventors: Son-Uk Lee, Gyeonggi-do (KR); Sung-Jin Kim, Gyeonggi-do (KR); Jae-Byung Park, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 859 days.

(21) Appl. No.: 11/980,250

(22) Filed: Oct. 29, 2007

(65) Prior Publication Data

US 2008/0272987 A1 Nov. 6, 2008

(30) Foreign Application Priority Data

May 2, 2007 (KR) .................. 10-2007-0042721

(51) Int. Cl.
*G09G 3/20* (2006.01)
(52) U.S. Cl. ................ 345/55; 345/76; 345/87
(58) Field of Classification Search ............. 345/55–111
See application file for complete search history.

(56) References Cited

U.S. PATENT DOCUMENTS

| | | | |
|---|---|---|---|
| 7,075,502 B1 * | 7/2006 | Drzaic et al. .................... 345/55 |
| 7,177,067 B1 * | 2/2007 | Sakamoto .................... 359/296 |
| 7,352,354 B2 * | 4/2008 | Ishige ........................... 345/107 |
| 2004/0046725 A1 * | 3/2004 | Lee .................................... 345/88 |
| 2006/0146067 A1 * | 7/2006 | Schweng et al. .............. 345/591 |
| 2007/0013649 A1 * | 1/2007 | Kim et al. ..................... 345/107 |
| 2007/0030284 A1 * | 2/2007 | Ogasawara et al. ........... 345/589 |
| 2007/0076269 A1 * | 4/2007 | Kido et al. .................... 358/474 |
| 2007/0132675 A1 * | 6/2007 | Asao .............................. 345/80 |
| 2007/0153196 A1 * | 7/2007 | Jang et al. .................... 349/141 |
| 2008/0165264 A1 * | 7/2008 | Saito et al. .................... 348/296 |

FOREIGN PATENT DOCUMENTS

| | | |
|---|---|---|
| KR | 10-2004-0043865 | 5/2004 |
| KR | 10-2004-0083648 | 10/2004 |
| KR | 10-2005-0052496 | 6/2005 |

OTHER PUBLICATIONS

Korean Patent Abstracts, Publication No. 1020040043865, May 27, 2004, 1 p.
Korean Patent Abstracts, Publication No. 1020040083648, Oct. 6, 2004, 1 p.
English Language Abstract, International Publication No. WO 2004/025611 A2, Mar. 25, 2004, 1 p.

* cited by examiner

*Primary Examiner* — Alexander Eisen
*Assistant Examiner* — Viet Pham
(74) *Attorney, Agent, or Firm* — Innovation Counsel LLP (57) ABSTRACT

A display apparatus having pixel areas defined on a substrate. First color pixels having a white color and second color pixels having a color different from that of the first color pixels are aligned in each pixel area in the form of a matrix. The second color pixels are adjacent to the first color pixels in the row and column directions.

20 Claims, 12 Drawing Sheets

DISPLAY APPARATUS INCLUDING PIXELS HAVING IMPROVED BRIGHTNESS AND CONTRAST RATIO

CROSS-REFERENCE TO RELATED APPLICATION

This application relies for priority upon Korean Patent Application No. 10-2007-42721 filed on May 2, 2007, the contents of which are incorporated herein by reference in their entirety.

BACKGROUND OF THE INVENTION

1. Field of the Invention

The present invention relates to a display apparatus. More particularly, the present invention relates to a display apparatus capable of providing improved display quality.

2. Description of the Related Art

In general, display apparatuses display images corresponding to data processed in an information processor. The display apparatuses are classified into various types according to the method of displaying images and components used to display the images. For instance, an electrophoretic display apparatus includes an electrophoretic layer between two transparent substrates to display images.

The electrophoretic display apparatus includes top and bottom electrodes formed on two opposite substrates, respectively. The electrophoretic layer including first and second particles is provided between the top and bottom electrodes. The first particles are charged with a polarity opposite to that of the second particles and have a color different from that of the second particles.

If an electric field is applied between the top and bottom electrodes due to the electric potential between the top and bottom electrodes, the alignment state of the first and second particles is changed between the top and bottom electrodes. As a result, when an external light is reflected from the first particles, a viewer may recognize the color of the first particles. When the external light is reflected from the second particles, the viewer may recognize the color of the second particles.

However, because the electrophoretic display apparatus is a reflective display apparatus, the brightness of the image is lower as compared to that of other display apparatuses having additional light sources.

SUMMARY OF THE INVENTION

Therefore, the present invention provides a display apparatus capable of improving a display quality thereof.

In one aspect, a display apparatus includes a first base substrate on which pixel areas are defined, a second base substrate facing the first base substrate, pixel electrodes formed on the first base substrate, a common electrode formed on the second base substrate, and color pixels formed on the first base substrate or the second base substrate corresponding to the pixel areas, respectively.

The color pixels include first color pixels and second color pixels. The first color pixels represent a white color and the second color pixels represent a color different from that of the first color pixels. The second color pixels have an area equal to or less than an area of the first color pixels. The brightness of the display apparatus is improved by the first color pixel, so that the display quality of the display apparatus is improved.

In another aspect, a display apparatus includes color pixels consisting of first white color pixels and second color pixels representing a color different from the color of the first color pixels. The second color pixels are aligned in a form of a matrix in cooperation with the first color pixels and positioned adjacent to the first color pixels in row and column directions.

That is, the first color pixels are adjacent to the second color pixels in the column and row directions in the display apparatus and the second color pixels are adjacent to the first color pixels in the column and row directions in the display apparatus. Thus, the brightness of the display apparatus is improved by the first color pixels. In addition, light leakage phenomenon that occurs when the first color pixels are consecutively aligned may be prevented.

BRIEF DESCRIPTION OF THE DRAWINGS

The above and other advantages of the present invention will become readily apparent by reference to the following detailed description when considered in conjunction with the accompanying drawings wherein.

DESCRIPTION OF THE EMBODIMENTS

Hereinafter, exemplary embodiments of the present invention are described in detail with reference to accompanying drawings. However, the present invention is not limited to the following embodiments but includes various applications and modifications. The following embodiments are provided to clarify the technical spirit disclosed in the present invention and to sufficiently transmit the technical spirit of the present invention to the one having mean knowledge and skill in this field. Therefore, the scope of the present invention is not limited to the following embodiments. In addition, the size of the layers and regions of the attached drawings along with the following embodiments are simplified or exaggerated for precise explanation or emphasis and the same reference numeral represents the same component.

Figure 1:
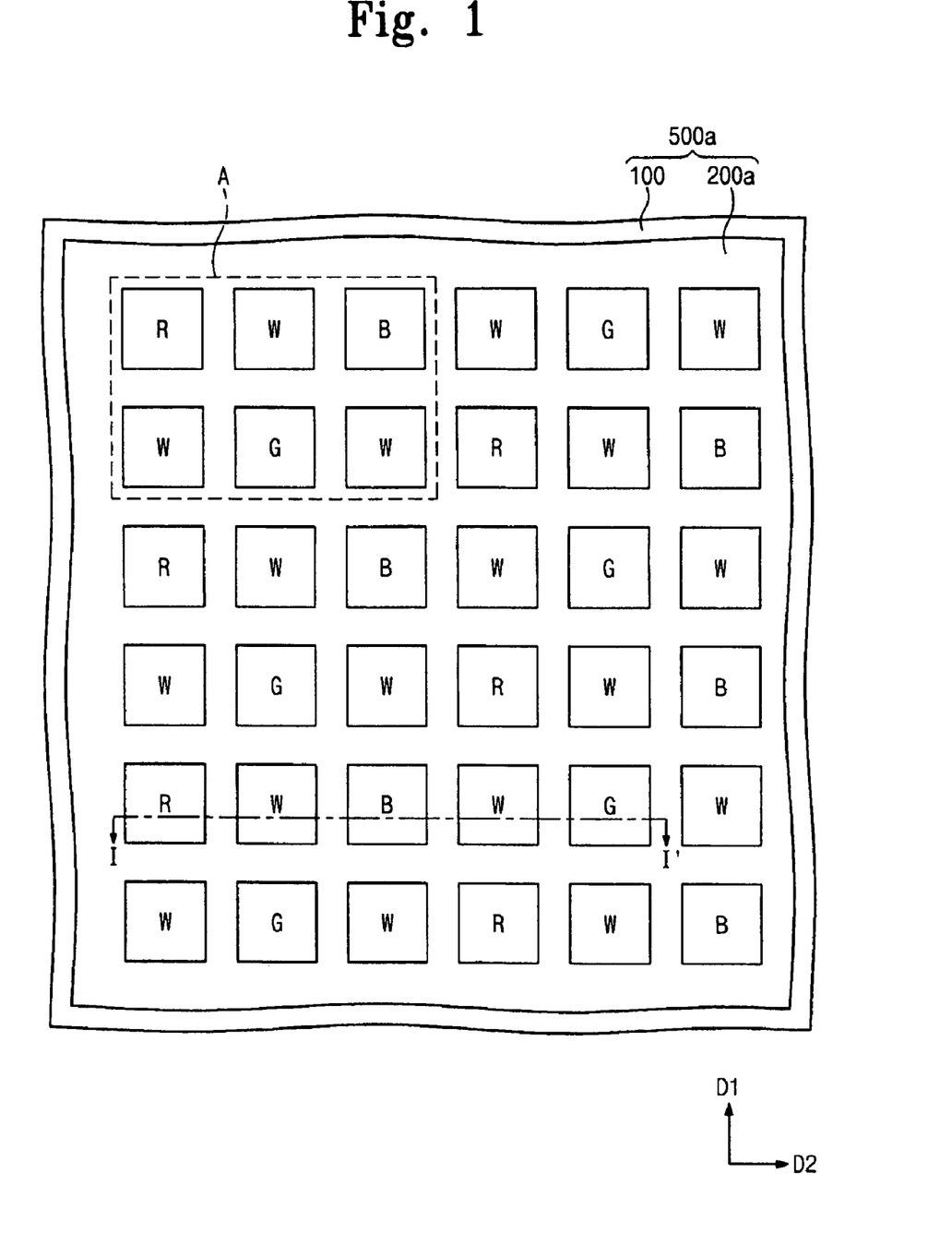
FIG. 1 is a plan view showing an electrophoretic display apparatus according to a first embodiment of the present invention.
Figure 2:
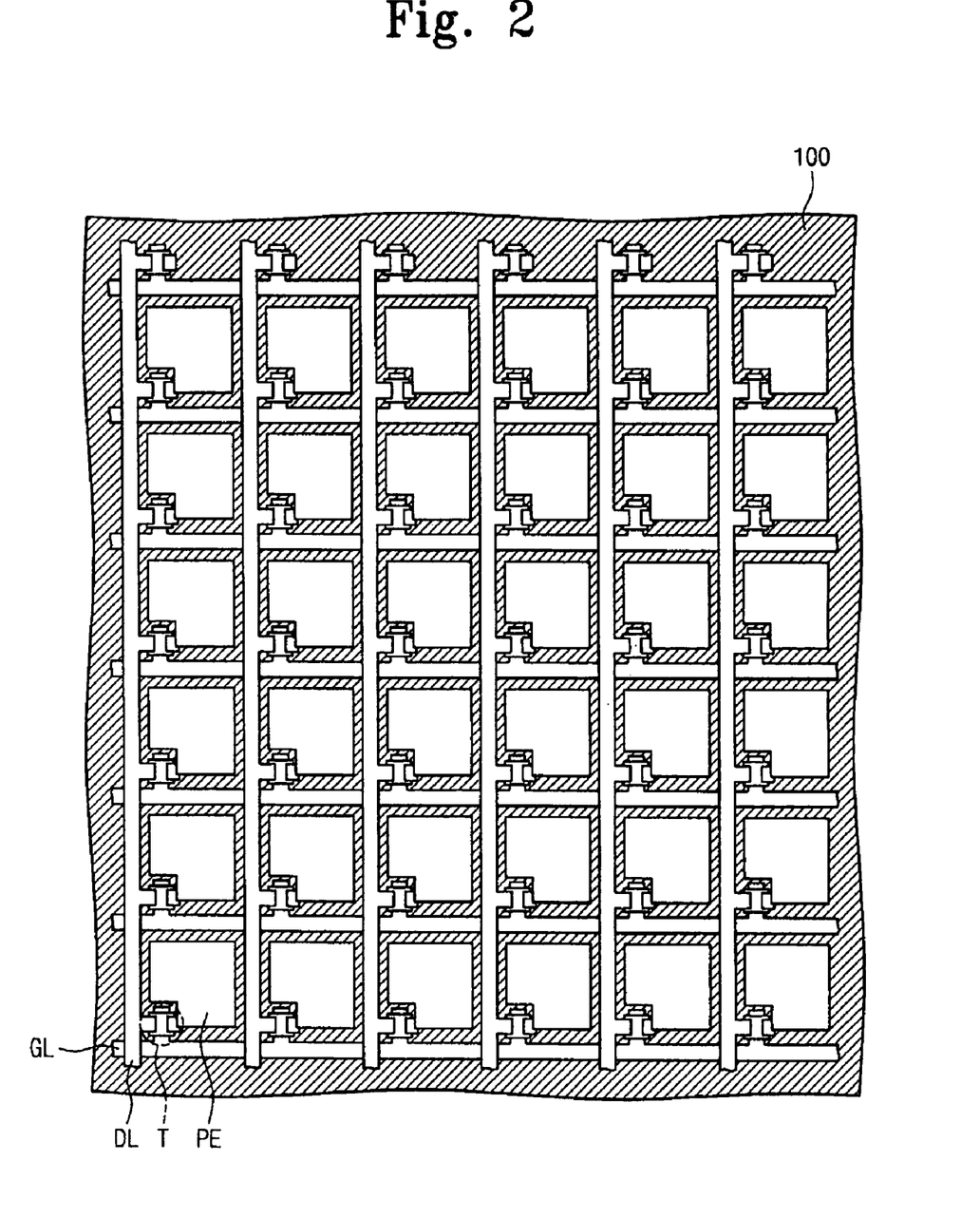
FIG. 2 is a plan view showing a thin film transistor substrate of the electrophoretic display apparatus shown in FIG. 1.

FIG. 1 is a plan view showing an electrophoretic display apparatus 500*a* according to a first embodiment of the present invention, and FIG. 2 is a plan view showing a thin film transistor substrate of the electrophoretic display apparatus 500*a* shown in FIG. 1.

Referring to FIGS. 1 and 2, the electrophoretic display apparatus 500*a* includes an opposite substrate 200*a*, a thin film transistor (TFT) substrate 100 facing the opposite substrate 200a, and an electrophoretic layer 350 (see, FIG. 3) interposed between the opposite substrate 200a and the TFT substrate 100.

The opposite substrate 200a is a transparent glass substrate. A red pixel R having a red color, a green pixel G having a green color, and a blue pixel B having a blue color are formed on the opposite substrate 200a.

The red pixel R includes a red filter 410 (see, FIG. 3) formed on the opposite substrate 200a. The red pixel R is defined as an area showing the red color. That is, a white light passing through the red filter is filtered to have red color components, so that the red color is displayed to the exterior.

In the same manner, the green pixel G and the blue pixel B are defined as areas showing the green color and the blue color, and include the green filter 430 (see, FIG. 3) and the blue color 420 (see, FIG. 3), respectively.

The red pixel R, the green pixel G and the blue pixel B are aligned on the opposite substrate 200a in the form of a matrix. The red pixel R, the green pixel G, and the blue pixel B correspond to pixel electrodes PE formed on the TFT substrate 100 in a one-to-one correspondence.

In addition, a white pixel W having a white color is aligned on the opposite substrate 200a. The white pixel W is defined on a predetermined area of the opposite substrate 200a where two of the red pixel R, the green pixel G and the blue pixel B are spaced apart from each other. As a result, the opposite substrate 200a has no color filter corresponding to the white pixel W. Therefore, according to the present exemplary embodiment, when a light irradiated onto the white pixel W is reflected from the white particles, an external white light is reflected from the white particles, so that the white color is displayed. The white pixel W is described later in more detail with reference to FIG. 3.

The red pixel R, the green pixel G, the blue pixel B, and the white pixel W are aligned in the form of the matrix according to first and second rules.

According to the first rule, the white pixel W is adjacent to the red pixel R, the green pixel G, and the blue pixel B in the first and second directions D1 and D2. In other words, one white pixel W is not adjacent to the other white pixel W in the first and second directions D1 and D2, but adjacent to one pixel of the red pixel R, the green pixel G, and the blue pixel B.

According to the second rule, the red pixel R, the blue pixel B, and the green pixel G are repeatedly aligned in each row of the matrix, and only one pixel of the red pixel R, the blue pixel B and the green pixel G is aligned in each column of the matrix.

When the matrix is divided into sub-matrices A, each sub-matrix A includes three white pixels W, one red pixel R, one green pixel G and one blue pixel B. Thus, in the sub-matrix A having six pixels, the white pixel W has a proportion of 50%. In addition, since the matrix consists of a plurality of sub-matrices A, the white pixel W has a proportion of 50% in the matrix.

Accordingly, the number of the white pixels W provided in the electrophoretic display apparatus 500a is identical to the sum of the red pixels R, the green pixels R and the blue pixels B. As a result, the brightness of the electrophoretic display apparatus 500a may be improved by means of the white pixels W.

In addition, since the electrophoretic display apparatus 500a may display the white color and black color using the electrophoretic layer 350 (see, FIG. 3), the contrast ratio of the electrophoretic display apparatus 500a may be improved. For instance, when the electrophoretic display apparatus 500a displays the white color, the white pixel W exhibits the white color. When the electrophoretic display apparatus 500a displays the black color, the white pixel W exhibits the black color. That is, the brightness of the electrophoretic display apparatus 500a is not improved in all display modes, but is improved only when the electrophoretic display apparatus 500a displays the white color using the white pixel W. As a result, the contrast ratio of the electrophoretic display apparatus 500a may be improved.

In addition, since the white pixels W are not consecutively aligned, light leakage phenomenon may be prevented in the electrophoretic display apparatus 500a. That is, since the white pixels W are aligned in the row and column directions alternately with other pixels representing the color different from that of the white pixel W, the brightness may be uniformly improved over the whole pixel area of the electrophoretic display apparatus 500a.

The TFT substrate 100 is a transparent glass substrate on which pixel electrodes PE are aligned in the form of the matrix. Each pixel electrode PE is electrically connected to the thin film transistor T. The thin film transistor T receives the gate signal from the gate lines GL and switches the data signal, which is transferred to the pixel electrodes PE from the data lines, by using the gate signal.

Pixel electrodes PE formed on the TFT substrate 100 correspond to the red pixel R, the green pixel G, the blue pixel B, and the white pixel W, respectively. Accordingly, the pixel electrodes PE are aligned in the form of the matrix on the TFT substrate 100.

Figure 3:
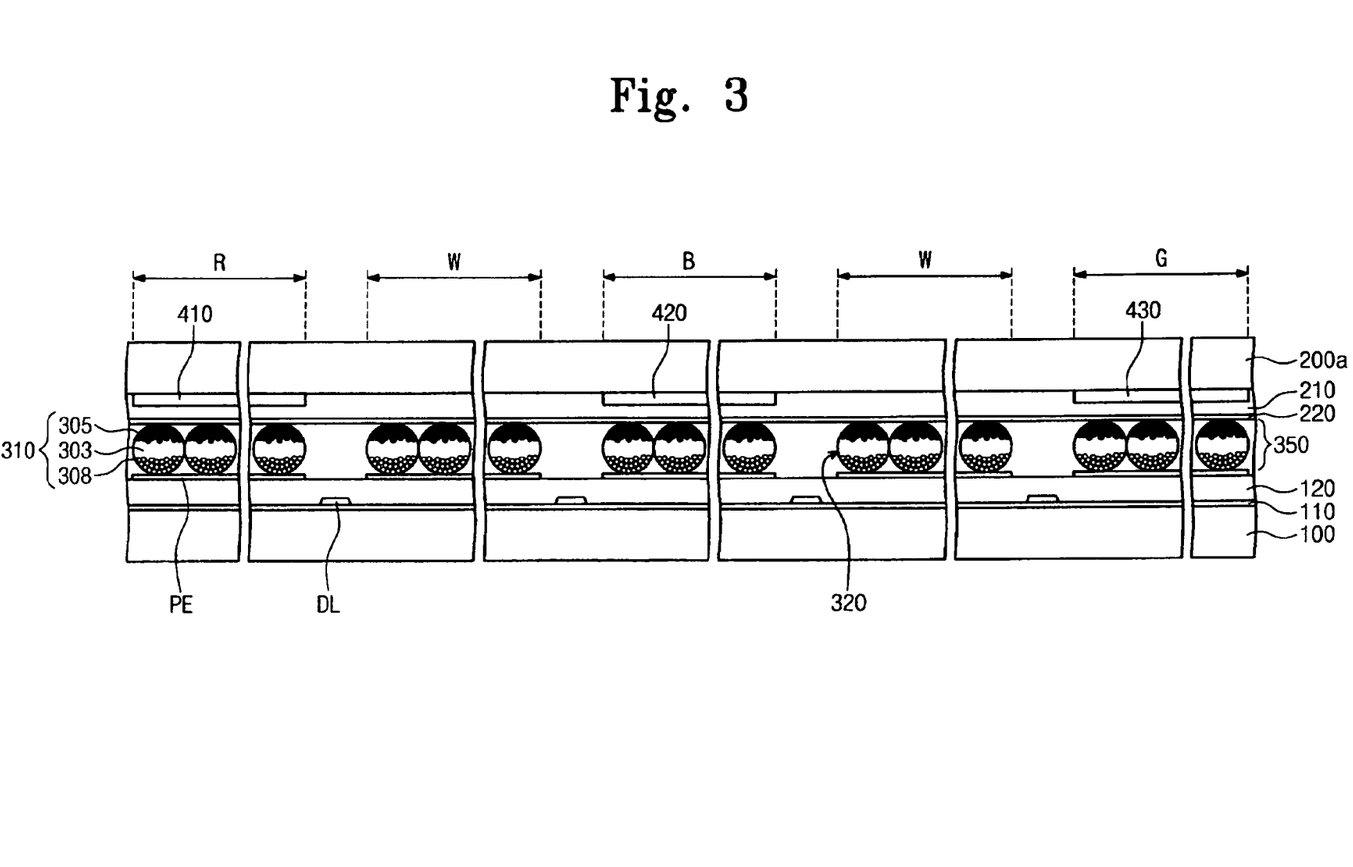
FIG. 3 is a sectional view taken along line I-I' shown in FIG. 1 according to an embodiment of the present invention.

FIG. 3 is a sectional view taken along line I-I' shown in FIG. 1 according to an embodiment of the present invention.

Referring to FIG. 3, a first insulating layer 110 is formed on the TFT substrate 100 and data lines DL are formed on the first insulating layer 110. In addition, a second insulating layer 120 is formed on the data lines DL in order to insulate the thin film transistor T (see, FIG. 2) from the pixel electrodes PE. The pixel electrodes PE are formed on the second insulating layer 120. The pixel electrodes PE are provided in the TFT substrate 100 to form the electric field in cooperation with a common electrode 220 of the opposite substrate 200a facing the TFT substrate 100. The pixel electrode PE is a transparent conductive layer including ITO (indium tin oxide) or IZO (indium zinc oxide).

The opposite substrate 200a further includes a red filter 410, a blue filter 420, and a green filter 430. The red filter 410 is positioned in a red pixel area of the opposite substrate 200a, the blue filter 420 is positioned in a blue pixel area of the opposite substrate 200a, and the green filter 430 is positioned in a green pixel area of the opposite substrate 200a.

A planar layer 210 is formed on the red filter 410, the blue filter 420 and the green filter 430. The planar layer 210 covers the red filter 410, the blue filter 420 and the green filter 430, and the common electrode 220 is planarly formed on the planar layer 210.

The common electrode 220 is provided on the opposite substrate 200a to form the electric field in cooperation with the pixel electrode PE. Similar to the pixel electrode PE, the common electrode 220 includes ITO (indium tin oxide) or IZO (indium zinc oxide).

The electrophoretic layer 350 is interposed between the TFT substrate 100 and the opposite substrate 200a. According to the first embodiment of the present invention, the electrophoretic layer 350 includes capsules 310.

Each capsule 310 includes particles 305 charged with a positive polarity, opposite particles 308 charged with a negative polarity, and an insulating material 303. In addition, each particle 305 includes TiO$_2$ representing the white color, and each opposite particle 308 includes carbon black representing the black color.

If the electric field is not formed between the pixel electrode PE and the common electrode 220, the particles 305 and opposite particles 308 are randomly aligned in the capsule 310. In contrast, if the electric field is formed between the pixel electrode PE and the common electrode 220, the alignment state of the particles 305 and opposite particles 308 is changed according to the direction of the electric field.

For instance, if the electric field is directed from the pixel electrode PE to the common electrode 220, the particles 305 move toward the common electrode 220 in the capsule 310, and the opposite particles 308 move toward the pixel electrode PE in the capsule 310. Thus, the external white light irradiated onto the opposite substrate 220b is reflected from the particles 305, so the user may recognize the white color represented by the particles 305.

That is, the color (white color or black color) represented by the capsule 310 is determined according to the alignment state of the particles 305 and the opposite particles 308 in the capsule 310.

Figure 4:
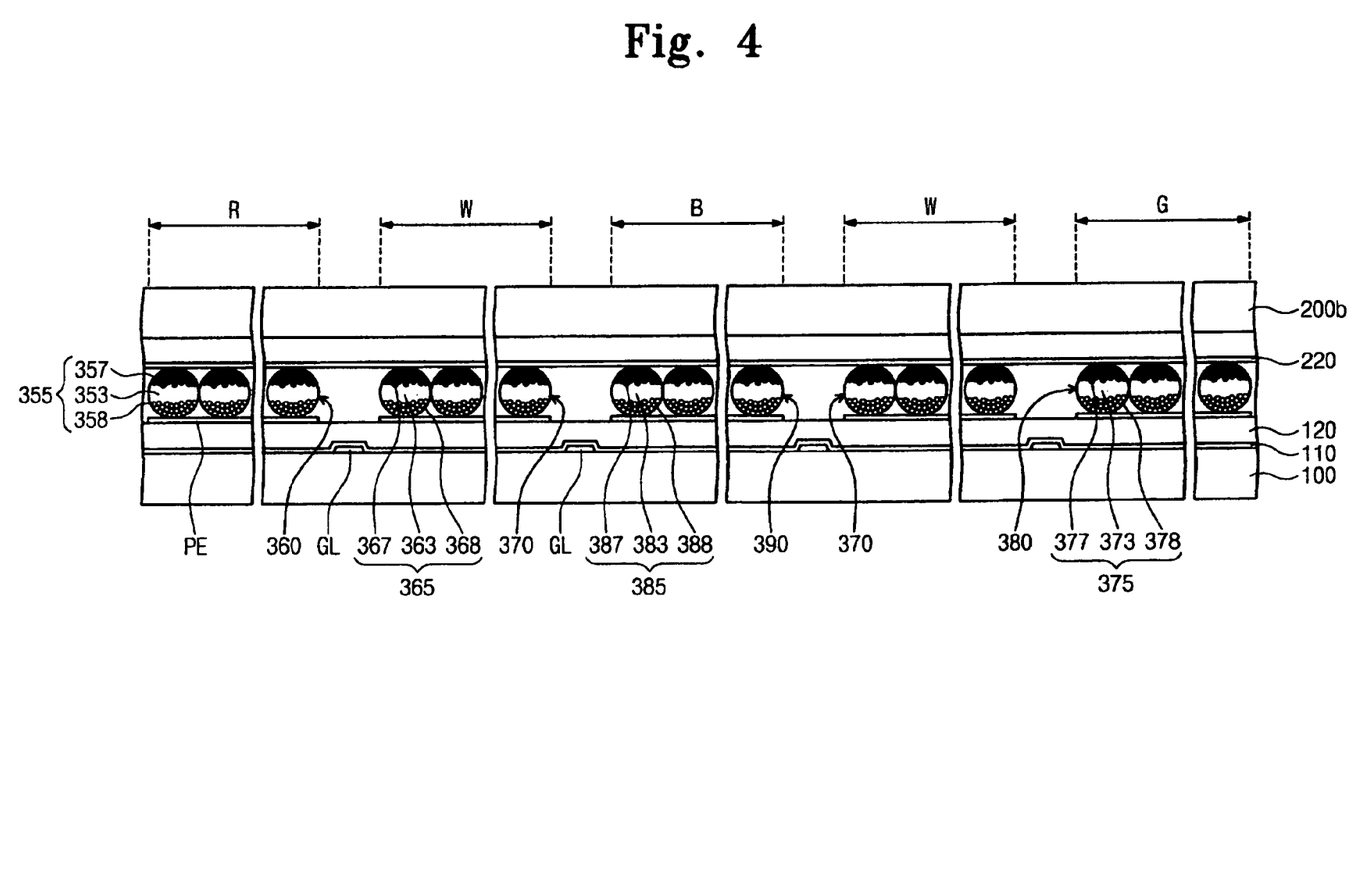
FIG. 4 is a sectional view taken along line I-I' shown in FIG. 1 according to another embodiment of the present invention.

FIG. 4 is a sectional view taken along line I-I' shown in FIG. 1 according to another embodiment of the present invention.

Referring to FIG. 4, first to fourth electrophoretic layers 360, 390, 370 and 380 are interposed between the TFT substrate 100 and the opposite substrate 200b.

The first electrophoretic layer 360 is interposed between the TFT substrate 100 and the opposite substrate 200b in correspondence with the red pixel area. The first electrophoretic layer 360 includes first capsules 355 and each first capsule 355 has first particles 357, which are charged with the positive polarity and represent the red color, first opposite particles 358, which are charged with the negative polarity and represent the black color, and an insulating material 353. Thus, the alignment state of the first particles 357 and the first opposite particles 358 are changed in the first capsule 355 according to the electric field formed between the common electrode 220 and the pixel electrode PE.

For instance, if the electric field is directed from the pixel electrode PE to the common electrode 220, the first particles 357 move toward the common electrode 220 in the first capsule 355, and the first opposite particles 358 move toward the pixel electrode PE in the capsule 355. Thus, the external white light irradiated onto the opposite substrate 220b is reflected from the first particles 357, so the user may recognize the green pixel area as the red color represented by the first capsule 355.

The second electrophoretic layer 370 is interposed between the TFT substrate 100 and the opposite substrate 200b in correspondence with the white pixel area. The second electrophoretic layer 370 includes second capsules 365 and each second capsule 365 includes second particles 367, which are charged with the positive polarity and represent the white color, second opposite particles 368, which are charged with the negative polarity and represent the black color, and an insulating material 363. Thus, the white color or the black color is represented according to the alignment state of the second particles 367 and the second opposite particles 368 in the second capsule 365.

The third electrophoretic layer 380 is interposed between the TFT substrate 100 and the opposite substrate 200b in correspondence with the green pixel area. The third electrophoretic layer 380 includes third capsules 375 and each third capsule 375 includes third particles 377, which are charged with the positive polarity and represent the green color, third opposite particles 378, which are charged with the negative polarity and represent the black color, and an insulating material 373. Thus, the green color or the black color is represented according to the alignment state of the third particles 377 and the third opposite particles 378 in the third capsule 375.

The fourth electrophoretic layer 390 is interposed between the TFT substrate 100 and the opposite substrate 200b in correspondence with the blue pixel area. The fourth electrophoretic layer 390 includes fourth capsules 385 and each fourth capsule 385 includes fourth particles 387, which are charged with the positive polarity and represent the blue color, fourth opposite particles 388, which are charged with the negative polarity and represent the black color, and an insulating material 383. Thus, the blue color or the black color is represented according to the alignment state of the fourth particles 387 and the fourth opposite particles 388 in the fourth capsule 385.

Figure 5:
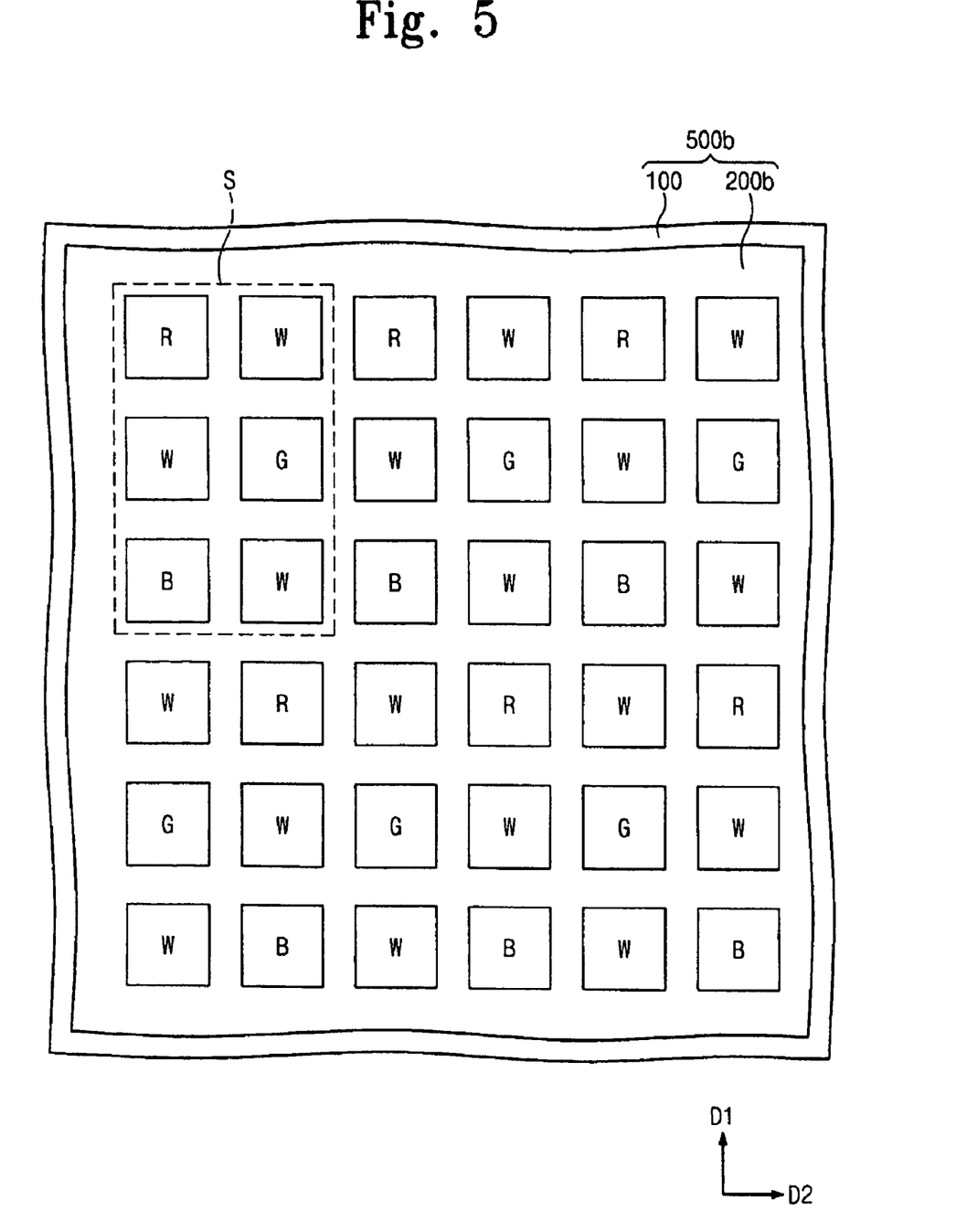
FIG. 5 is a plan view showing an electrophoretic display apparatus according to a second embodiment of the present invention.

FIG. 5 is a plan view showing an electrophoretic display apparatus 500b according to a second embodiment of the present invention. In the following description of FIG. 5, the same reference numerals are assigned to the same elements and the detailed description thereof will be omitted in order to avoid redundancy.

Referring to FIG. 5, the red pixel R, the green pixel G, the blue pixel B, and the white pixel W are aligned on the opposite substrate 200b in the form of the matrix according to first and second rules.

According to the first rule, the white pixel W is adjacent to the red pixel R, the green pixel G, and the blue pixel B in the first and second directions D1 and D2. In other words, one white pixel W is not adjacent to another white pixel W in the first and second directions D1 and D2, but is adjacent to one pixel of the red pixel R, the green pixel G, and the blue pixel B.

According to the second rule, only one pixel of the red pixel R, the blue pixel B and the green pixel G is aligned in each row of the matrix, and the red pixel R, the blue pixel B and the green pixel G are repeatedly aligned in each column of the matrix.

When the matrix is divided into sub-matrices S, each sub-matrix S includes three white pixels W, one red pixel R, one green pixel G and one blue pixel B. Thus, in the sub-matrix S having six pixels, the white pixel W has a proportion of 50%. In addition, since the matrix consists of a plurality of sub-matrices S, the white pixel W has a proportion of 50% in the matrix.

Accordingly, the number of white pixels W provided in the electrophoretic display apparatus 500b is identical to the sum of the red pixels R, the green pixels R and the blue pixels B. As a result, the brightness of the electrophoretic display apparatus 500a may be improved by means of the white pixels W.

Therefore, similar to the electrophoretic display apparatus 500a according to the first embodiment of the present invention, the electrophoretic display apparatus 500b according to the second embodiment of the present invention may improve the brightness and contrast ratio thereof. Since the white pixels W are not consecutively aligned, light leakage phenomenon may be prevented in the electrophoretic display apparatus 500b. Although electrophoretic layers of the electrophoretic display apparatus 500b are not described in the second embodiment, the electrophoretic display apparatus 500b according to the second embodiment of the present invention may include the electrophoretic layers in the form of capsules 310 (see, FIG. 3) or first to fourth electrophoretic layers 360 to 390 (see, FIG. 5).

Figure 6:
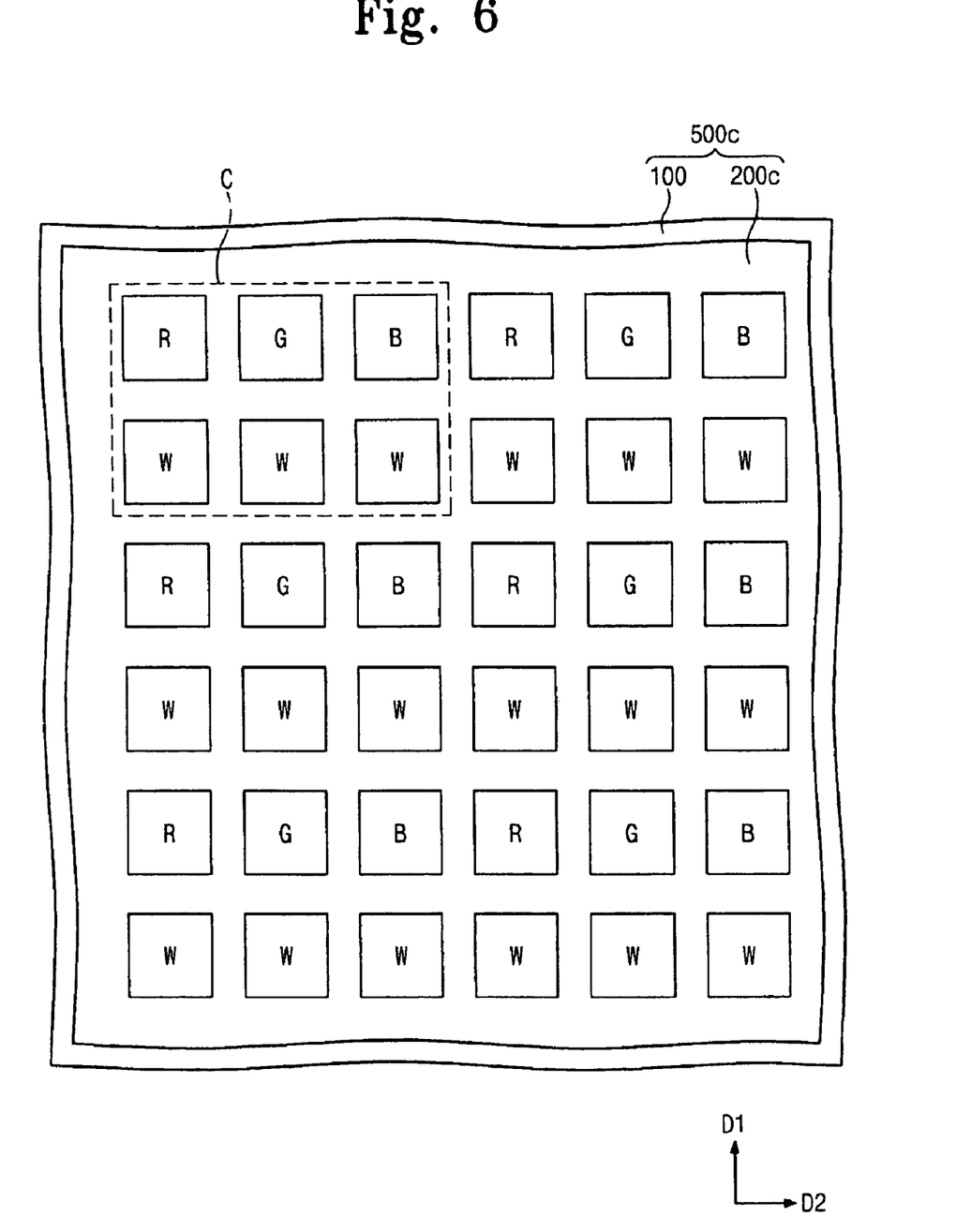
FIG. 6 is a plan view showing an electrophoretic display apparatus according to a third embodiment of the present invention.

FIG. 6 is a plan view showing an electrophoretic display apparatus 500c according to a third embodiment of the present invention. In the following description of FIG. 6, the same reference numerals are assigned to the same elements and the detailed description thereof will be omitted in order to avoid redundancy.

Referring to FIG. 6, the red pixel R, the green pixel G, the blue pixel B and the white pixel W are aligned on the opposite substrate 200b in the form of the matrix. The matrix includes odd rows, in which the red pixel R, the green pixel G, and the blue pixel B are sequentially and repeatedly aligned, and even rows, in which only the white pixels W are aligned. The odd and even rows are alternately aligned in the first direction D1.

In other words, in the matrix, the red pixel R, the green pixel G or the blue pixel B is interposed between the white pixels W in the first direction D1.

When the matrix is divided into sub-matrices C, each sub-matrix C includes three white pixels W, one red pixel R, one green pixel G and one blue pixel B. Thus, in the sub-matrix C having six pixels, the white pixel W has a proportion of 50%. In addition, since the matrix consists of a plurality of sub-matrices C, the white pixel W has a proportion of 50% in the matrix.

Therefore, similar to the electrophoretic display apparatuses 500a and 500b according to the first and second embodiments of the present invention, the electrophoretic display apparatus 500c according to the third embodiment of the present invention may improve the brightness and contrast ratio thereof.

Although electrophoretic layers of the electrophoretic display apparatus 500c are not described in the third embodiment, the electrophoretic display apparatus 500c according to the third embodiment of the present invention may include the electrophoretic layers in the form of capsules 310 (see, FIG. 3) or first to fourth electrophoretic layers 360 to 390 (see, FIG. 5) according to the first and second embodiments.

Figure 7A:
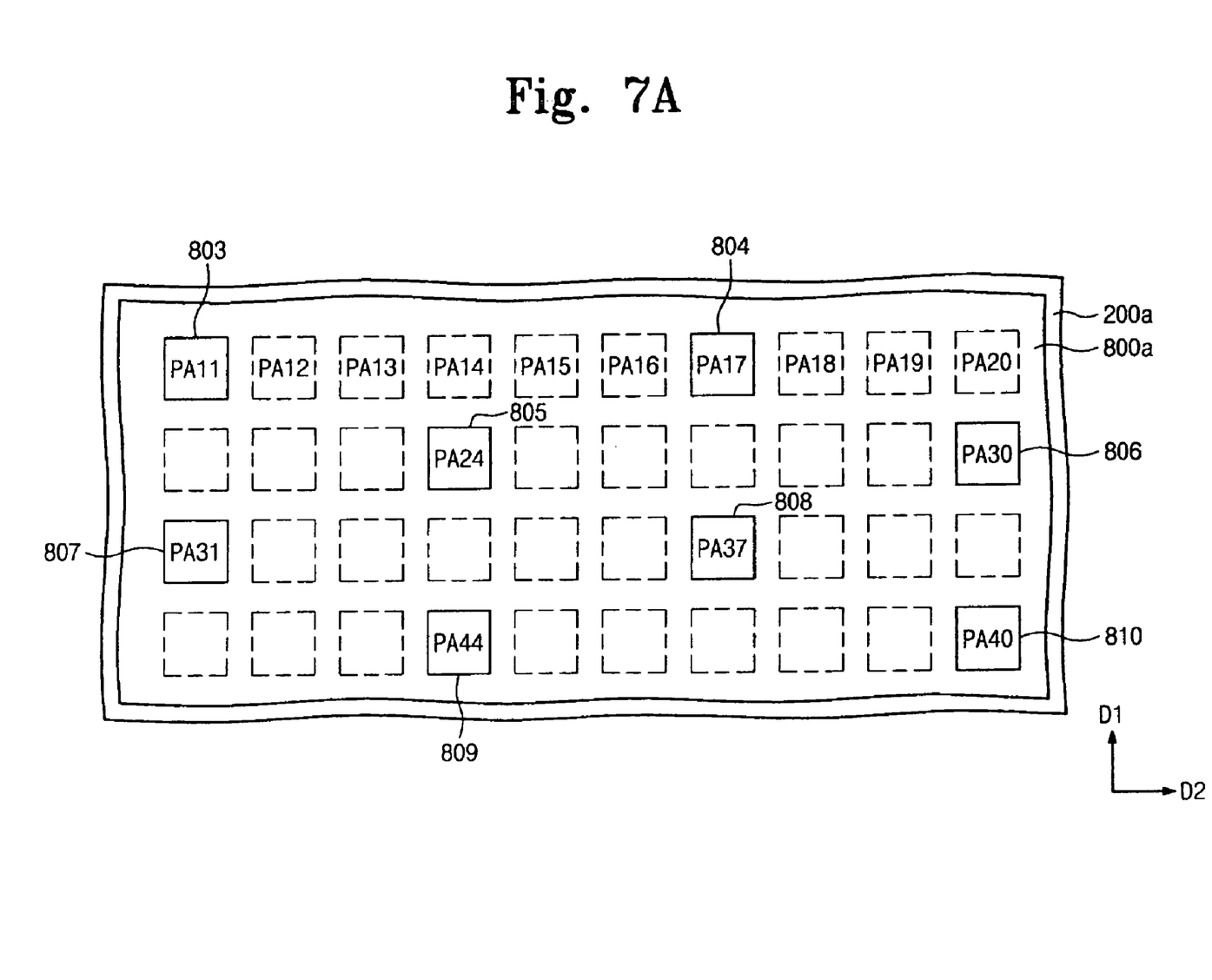
FIG. 7A is a plan view of a first photo mask.
Figure 7B:
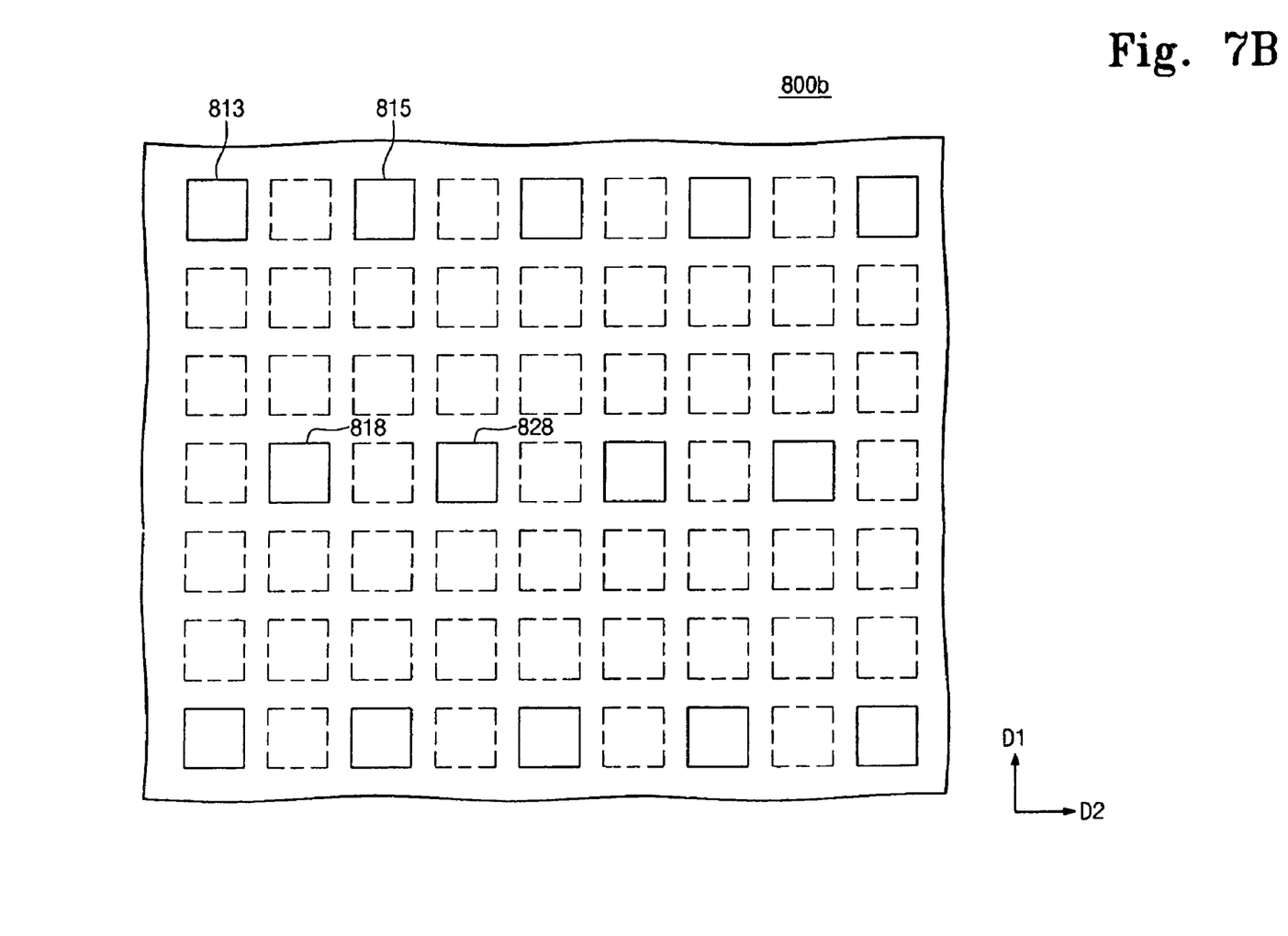
FIG. 7B is a plan view of a second photo mask.

FIG. 7A is a plan view of a first photo mask used to manufacture the electrophoretic display apparatus according to the first embodiment of the present invention, FIG. 7B is a plan view of a second photo mask used to manufacture the electrophoretic display apparatus according to the second embodiment of the present invention, and FIGS. 8A to 8G are views showing the manufacturing procedure for the electrophoretic display apparatus according to the first embodiment of the present invention.

In detail, FIG. 7A and FIGS. 8A to 8G show the case in which one photo mask is used for three photolithograph processes to form the pixels on the opposite substrate 200a in the alignment state as shown in FIG. 1. The detailed process of forming the pixels in the alignment state as shown in FIG. 5 by using the second photo mask is similar to the process shown in FIGS. 8A to 8G, and accordingly a description thereof is not required.

For the purpose of convenience, a pixel area formed on the opposite substrate 200a will be denoted as a pixel area PAab if the pixel area is aligned in an $a^{th}$ row and a $b^{th}$ column in the matrix.

The opposite substrate 200a is disposed under the first photo mask 800a in FIG. 7A in order to facilitate explanation of the first photo mask 800a. Light transmission units 803 to 810 are defined on the first photo mask 800a. According to an embodiment of the present invention, the light transmission units 803 to 810 are obtained by cutting predetermined portions of the first photo mask 800a. Therefore, the light proceeding toward the opposite substrate 200a from the top of the first photo mask 800a is partially irradiated onto the opposite substrate 200a through the light transmission units 803 to 810.

Pixel areas PA11 to PA40 are defined on the opposite substrate 200a. As described above, the pixels are formed in the pixel areas PA11 to PA40 on the opposite substrate 200a.

If the alignment state of the light transmission units 803 to 810 is identical to the alignment state of the red pixel R, the green pixel G or the blue pixel B, the red pixel R, the green pixel G or the blue pixel B having the alignment state identical to that of the pixels shown in FIG. 1 may be formed on the opposite substrate 200a by using the first photo mask 800a. That is, the red pixel R, the green pixel G, the blue pixel B, and white pixel W may be formed on the opposite substrate 200a by using one photo mask.

For instance, after covering the opposite substrate 200a with the first photo mask 800a such that the light transmission units 803 to 810 are placed on first pixel areas PA11, PA17, PA24, PA30, PA37, PA44, and PA40, the first exposure process is performed relative to the opposite substrate 200a, thereby forming the red pixel R on the first pixel areas.

In order to form the blue pixel B, the first photo mask 800a is moved in the second direction D2 such that the light transmission units 803 to 810 are placed on second pixel areas PA13, PA19, PA26, PA33, PA39, and PA46, and then the second exposure process is performed relative to the opposite substrate 200a, thereby forming the blue pixel B on the second pixel areas.

Similarly, in order to form the green pixel G, the first photo mask 800a is moved in the second direction D2 such that the light transmission units 803 to 810 are placed on third pixel areas PA15, PA22, PA28, PA35, PA42, and PA48, and then the third exposure process is performed relative to the opposite substrate 200a, thereby forming the green pixel G on third second pixel areas.

Therefore, the red pixel R, the green pixel G, and the blue pixel B having the alignment state identical to that of the pixels shown in FIG. 1 may be formed on the opposite substrate 200a by using one photo mask 800a. The white pixels W are defined on pixel areas (for instance, PA12, PA14, PA16, PA18, etc) where two of the red pixel R, the green pixel G, and the blue pixel B are spaced apart from each other.

Referring to FIG. 7B, light transmission units 813, 815, 818 and 828 are defined on the second photo mask 800b. The red pixel R, the blue pixel B, the green pixel G, and the white pixel W having the alignment state as shown in FIG. 5 may be formed on the opposite substrate 200a by performing the exposure process three times using one second photo mask 800b.

For instance, the red pixel R is formed on the opposite substrate 200a in correspondence with the light transmission units 813, 815, 818 and 828 through the first exposure process. Then, the photo mask is moved in the first direction D1 by a predetermined distance corresponding to one pixel area, and then is moved in the second direction D2 by a predetermined distance corresponding to one pixel area. In this state, the second exposure process is performed to form the green pixel G. In addition, after the green pixel G has been formed, the photo mask is moved in the first direction D1 by a predetermined distance corresponding to one pixel area, and then is moved in the second direction D2 by a predetermined distance corresponding to one pixel area. In this state, the third exposure process is performed to form the blue pixel B.

In this manner all of the red pixel R, the green pixel G, and the blue pixel B having the alignment state identical to the alignment state of the pixels shown in FIG. 5 may be formed on the opposite substrate 200a by using one second photo mask 800b.

FIGS. 8A to 8G are views showing the manufacturing procedure for the electrophoretic display apparatus 500a according to the first embodiment of the present invention. In detail, FIGS. 8A to 8G show the process of forming the red pixel R, the green pixel G, and the blue pixel B on the opposite substrate 200a by using the first photo mask 800a. The following description of FIGS. 8A to 8G includes the above-mentioned first to third exposure process using the first photo mask 800a.

Figure 8A:
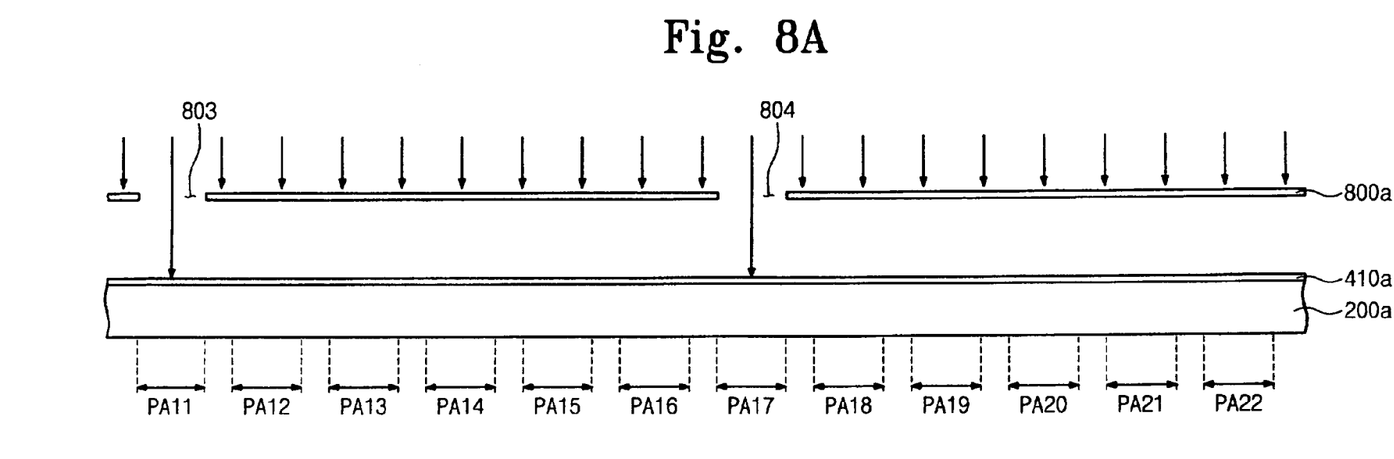
FIGS. 8A to 8G are views showing the manufacturing procedure for the electrophoretic display apparatus according to the first embodiment of the present invention.

Referring to FIG. 8A, in order to form the red pixel R on the opposite substrate 200a in correspondence with the pixel areas PA11 and PA17, a red photoresist film 410a is primarily formed on the opposite substrate 200a. When the red photoresist film 410a has been formed on the opposite substrate 200a, the opposite substrate 200a is covered with the first photo mask 800a in such a manner that the first and second light transmission units 803 and 805 are aligned corresponding to the pixel areas PA11 and PA17, respectively. Then, the first exposure process is performed by irradiating the light that reacts with the red photoresist film 410a onto the opposite substrate 200a.

The light is selectively irradiated onto the red photoresist film 410a by means of the first photo mask 800a, so that predetermined portions of the red photoresist film 410a corresponding to the pixel areas PA11 and PA17 may have special property. That is, the predetermined portions of the red photoresist film 410a are not etched even if the developing solution is applied thereto.

Figure 8B:
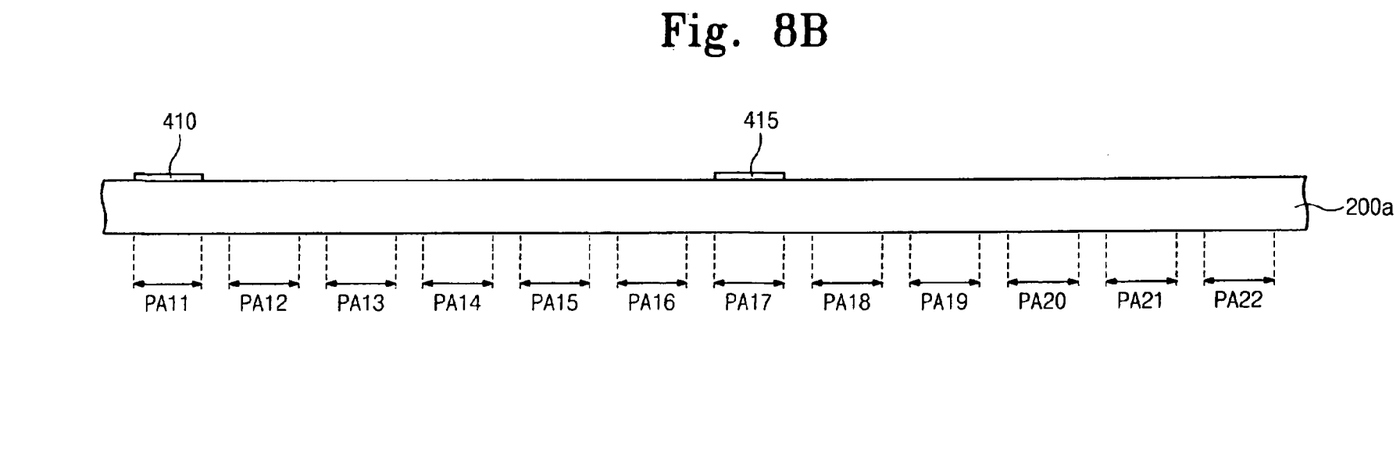

Referring to FIG. 8B, after the first exposure process has been completed, the red photoresist film 410a is developed, so that red filters 410 and 415 are formed on the opposite substrate 200a in correspondence with the pixel areas PA11 and PA17.

Figure 8C:
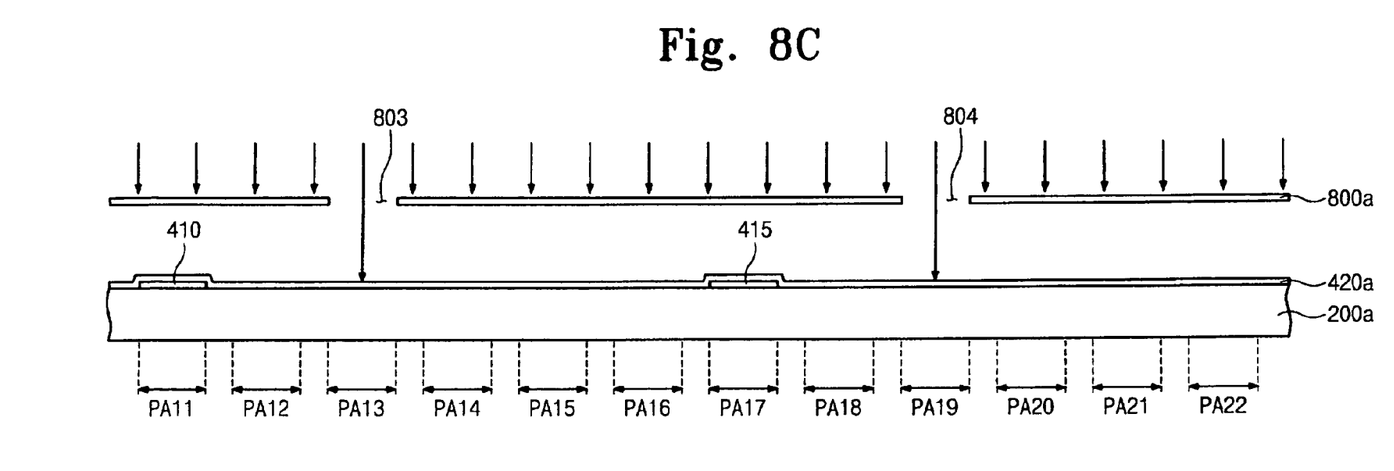

Referring to FIG. 8C, in order to form the green pixel G on the opposite substrate 200a in correspondence with the pixel areas PA13 and PA19, a green photoresist film 410b is primarily formed on the opposite substrate 200a.

When the green photoresist film 410b has been formed on the opposite substrate 200a, the opposite substrate 200a is covered with the first photo mask 800a in such a manner that the first and second light transmission units 803 and 805 are aligned corresponding to the pixel areas PA13 and PA19, respectively. Then, the second exposure process is performed by irradiating the light that reacts with the green photoresist film 410b onto the opposite substrate 200a.

As a result, the light is selectively irradiated onto the green photoresist film 410b by means of the first photo mask 800a, so that predetermined portions of the green photoresist film 410b corresponding to the pixel areas PA13 and PA19 may have special property. That is, the predetermined portions of the green photoresist film 410b are not etched even if the developing solution is applied thereto.

Figure 8D:
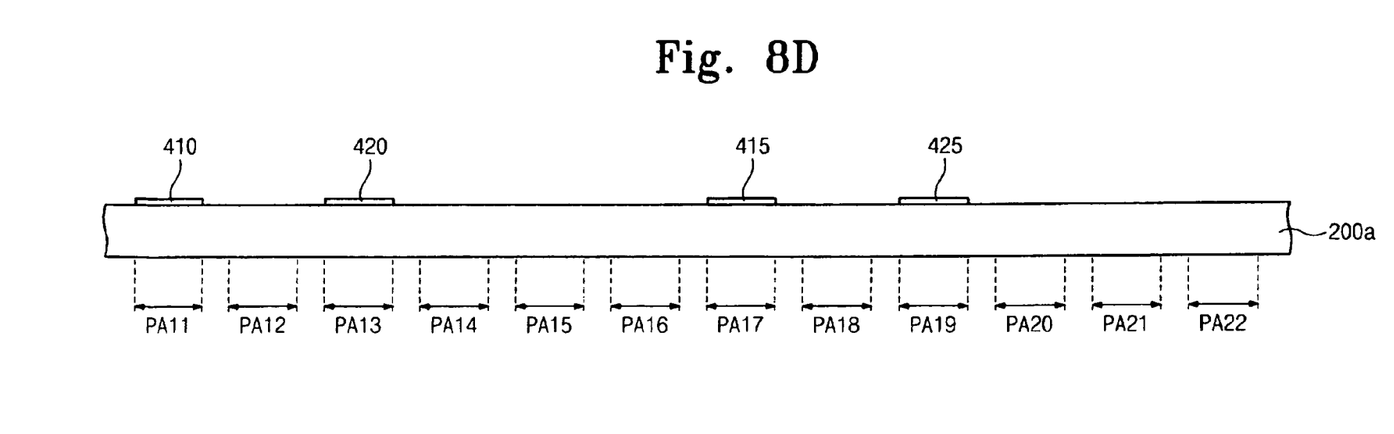

Referring to FIG. 8D, after the second exposure process has been completed, the green photoresist film 410b is developed, so that green filters 420 and 425 are formed on the opposite substrate 200a in correspondence with the pixel areas PA13 and PA19.

Figure 8E:
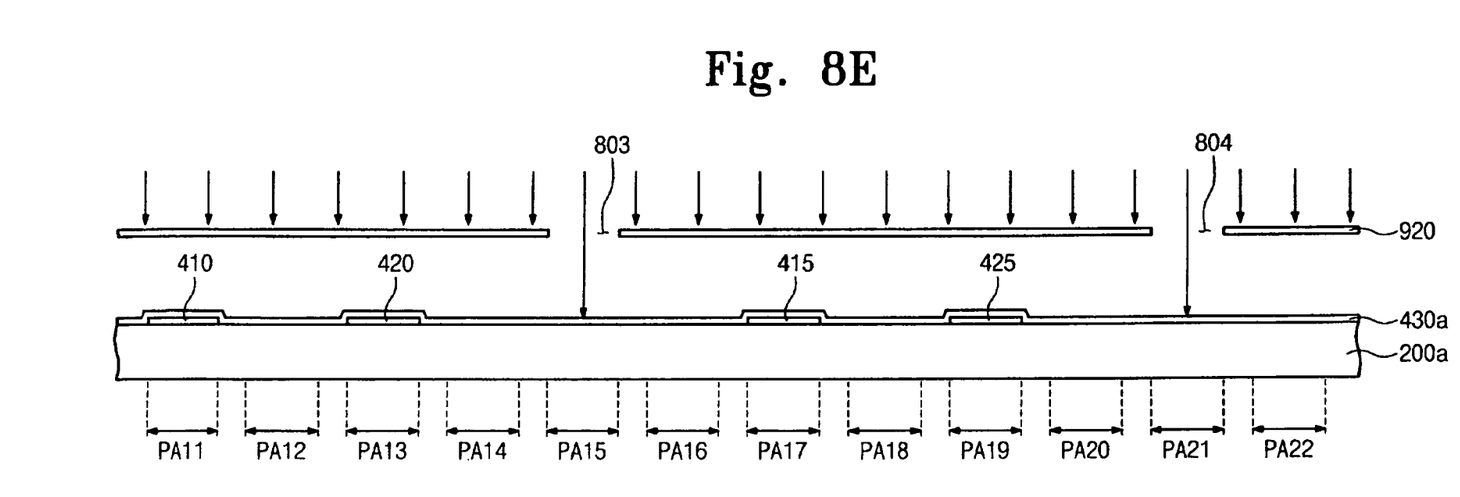
Figure 8F:
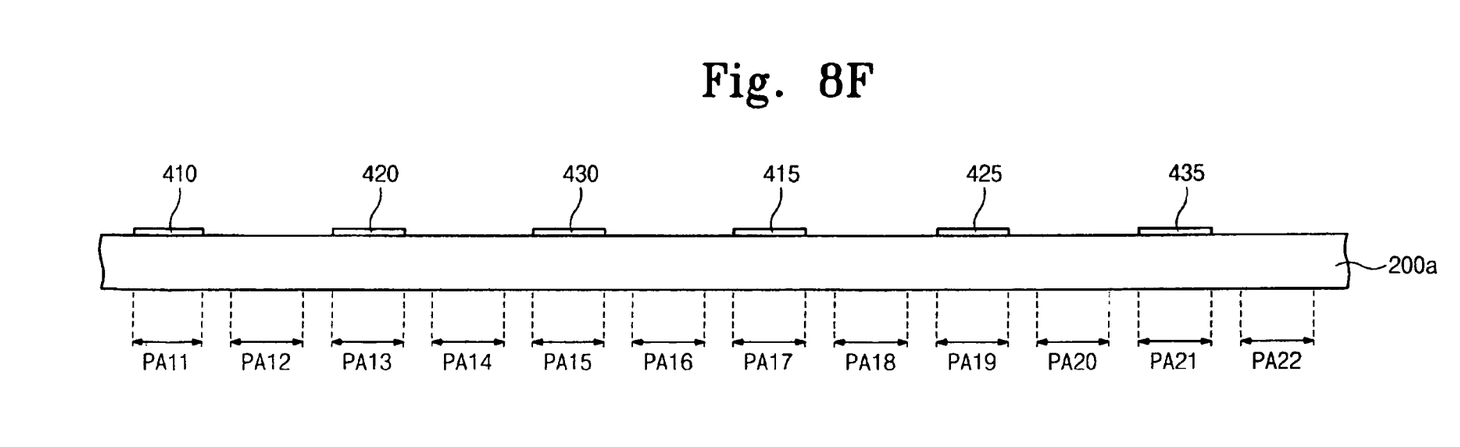

Referring to FIGS. 8E and 8F, a blue photoresist film 430a is formed on the opposite substrate 200a, and then the opposite substrate 200a is covered with the first photo mask 800a in such a manner that the first and second light transmission units 803 and 805 are aligned corresponding to the pixel areas PA15 and PA21.

After that, the third exposure process and the developing process are performed relative to the opposite substrate 200a, so that blue filters 430 and 435 are formed on the opposite substrate 200a corresponding to the pixel areas PA15 and PA21, respectively.

Figure 8G:
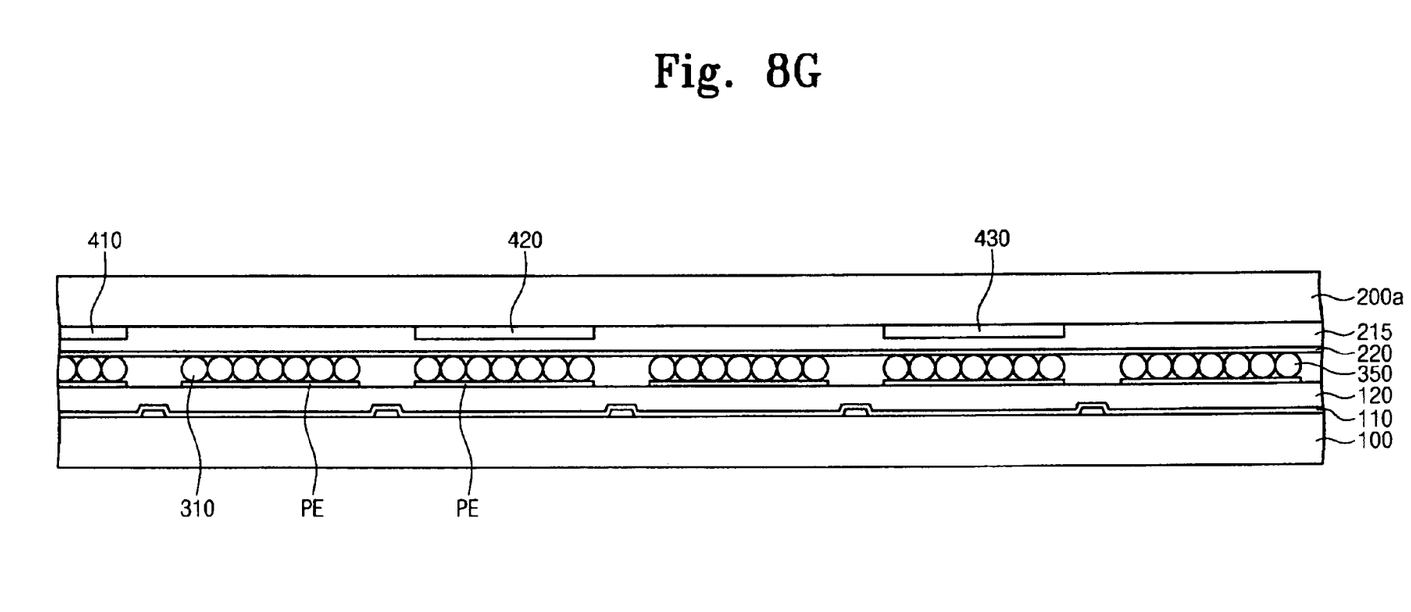

Referring to FIG. 8G, a planarization layer 215 and the common electrode 220 are sequentially formed on the opposite substrate 200a. Then, the TFT substrate 100 is combined with the opposite substrate 200a from the top of the opposite substrate 200a. In addition, the electrophoretic layer 350 is interposed between the opposite substrate 200a and the TFT substrate 100.

According to an embodiment of the present invention, the electrophoretic layer 350 includes capsules 310. Each capsule 310 includes particles and opposite particles therein, in which the particles represent the color different from that of the opposite particles and are charged with polarity different from that of the opposite particles. Accordingly, when the electric field is formed between the pixel electrode PE and the common electrode, the alignment state of particles and opposite particles is changed in the capsule 310, so that the color corresponding to the alignment state is displayed to the exterior.

As described above, the brightness of the display apparatus is improved by means of the white pixels provided in the pixel areas of the display apparatus. In addition, when the display apparatus exhibits the black color, the white pixel W displays the black color. Further, when the display apparatus exhibits the white color, the white pixel W displays the white color, so the contrast ratio of the display apparatus may be improved.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A display apparatus comprising:
   a first substrate on which pixel areas are defined;
   a second substrate facing the first substrate;
   a plurality of pixel electrodes formed in the pixel areas on the first substrate;
   a common electrode formed on the second substrate; and
   a plurality of color pixels formed on the first substrate or the second substrate and being associated with corresponding ones of the pixel areas, wherein the color pixels comprise first color pixels that represents a white color and other-colored pixels that represent colors different from the white color, the other-colored pixels including second, third, and fourth color pixels respectively representing colors different from each other, wherein each of the other-colored pixels has an area approximately equal to or less than an area of the first color pixels, and wherein, in both row and column directions, ones of the first color pixels alternate with ones of the other-colored pixels so as to form a repeating pattern, the repeating pattern comprising:
   in a first row or column, in order, one of the second color pixel, one of the first color pixels, and one of the third color pixels; and
   in a second row or column adjacent to the first row or column, in order, one of the first color pixels, one of the fourth color pixels, and one of the first color pixels.

2. The display apparatus of claim 1, wherein the first color pixels and other-colored pixels are aligned in a matrix.

3. The display apparatus of claim 2, wherein the first color pixels and other-colored pixels are repeatedly aligned in the row and the column directions.

4. The display apparatus of claim 3, wherein the second, third, and fourth color pixels comprise red pixels, green pixels and blue pixels, respectively.

5. The display apparatus of claim 4, wherein the pixel electrodes are positioned on the first substrate corresponding to the first color pixels, the red pixels, the green pixels and the blue pixels in a one-to-one correspondence.

6. The display apparatus of claim 4, wherein each of the red pixels, the green pixels and the blue pixels is aligned between adjacent first color pixels in each column, and at least one pixel of the red pixels, the green pixels and the blue pixels in each column is aligned between adjacent first color pixels in each row.

7. The display apparatus of claim 4, wherein each of the red pixels, the green pixels and the blue pixels is aligned between adjacent first color pixels in each row, and at least one pixel of the red pixels, the green pixels and the blue pixels in each row is aligned between adjacent first color pixels in each column.

8. The display apparatus of claim 1, wherein the other-colored pixels comprise color filters formed on the second substrate corresponding to an area of the other-colored pixels.

9. The display apparatus of claim 8, further comprising an electrophoretic layer interposed between the first and second substrates, wherein the electrophoretic layer comprises a plurality of particles each having therein black particles and white particles charged with a polarity different from a polarity of the black particles.

10. The display apparatus of claim 1, wherein the other-colored pixels comprise an electrophoretic layer interposed between the first and second base substrates corresponding to an area of the other-colored pixels.

11. The display apparatus of claim 10, wherein the electrophoretic layer comprises first particles having colors corresponding to the other-colored pixels and second particles charged with a polarity different from a polarity of the first particles and having a color different from that of the first particles.

12. A display apparatus comprising:
a first substrate on which pixel areas are defined;
a second substrate facing the first base substrate;
pixel electrodes formed on the first substrate;
a common electrode formed on the second substrate; and
color pixels formed on the second substrate and being associated with corresponding ones of the pixel areas, respectively,
wherein the color pixels comprise:
first color pixels representing a white color; and
other-colored pixels representing colors different from the color of the first color pixels, the other-colored pixels comprising second, third, and fourth color pixels respectively representing different colors from each other;
wherein the other-colored pixels are aligned in a matrix with the first color pixels and further wherein, in both row and column directions, ones of the first color pixels alternate with ones of the other-colored pixels so as to form a repeating pattern, the repeating pattern comprising:
in a first row or column, in order, one of the second color pixel, one of the first color pixels, and one of the third color pixels; and
in a second row or column adjacent to the first row or column, in order, one of the first color pixels, one of the fourth color pixels, and one of the first color pixels.

13. The display apparatus of claim 12, wherein the second, third, and fourth color pixels comprise red pixels, green pixels and blue pixels, respectively.

14. The display apparatus of claim 13, wherein the pixel electrodes are aligned on the first base substrate corresponding to the first color pixels, the red pixels, the green pixels and the blue pixels in a one-to-one correspondence.

15. The display apparatus of claim 13, wherein each of the red pixels, the green pixels and the blue pixels is aligned between adjacent first color pixels in each column, and at least one pixel of the red pixels, the green pixels and the blue pixels in each column is aligned between adjacent first color pixels in each row.

16. The display apparatus of claim 13, wherein each of the red pixels, the green pixels and the blue pixels is aligned between adjacent first color pixels in each row, and one pixel of the red pixels, the green pixels and the blue pixels in each row is aligned between adjacent first color pixels in each column.

17. The display apparatus of claim 13, wherein the red pixels comprise red filters formed on the second base substrate corresponding to areas of the red pixels, the green pixels comprise green filters formed on the second base substrate corresponding to areas of the green pixels, and the blue pixels comprise blue filters formed on the second base substrate corresponding to areas of the blue pixels.

18. The display apparatus of claim 17, further comprising an electrophoretic layer interposed between the first and second substrates, wherein the electrophoretic layer comprises a plurality of particles each having therein black particles and white particles charged with a polarity different from a polarity of the black particles.

19. The display apparatus of claim 13, wherein the red pixels comprise first electrophoretic layers interposed between the first and second base substrates corresponding to areas of the red pixels, the green pixels comprise second electrophoretic layers interposed between the first and second base substrates corresponding to areas of the green pixels, the blue pixels comprise third electrophoretic layers interposed between the first and second base substrates corresponding to areas of the blue pixels, and the first color pixels comprise fourth electrophoretic layers interposed between the first and second base substrates corresponding to areas of the first color pixels.

20. The display apparatus of claim 19, wherein the first electrophoretic layers comprise first red particles and first opposite particles charged with a polarity different from a polarity of the first red particles and having a color different from that of the first red particles, the second electrophoretic layers comprise second green particles and second opposite particles charged with a polarity different from a polarity of the second green particles and having a color different from that of the second green particles, the third electrophoretic layers comprise third blue particles and third opposite particles charged with a polarity different from a polarity of the third blue particles and having a color different from that of the third blue particles, and the fourth electrophoretic layers comprise fourth white particles and fourth opposite particles charged with a polarity different from a polarity of the fourth white particles and having a color different from that of the fourth white particles.

* * * * *